(12) United States Patent
Aoyama

(10) Patent No.: US 9,917,484 B2
(45) Date of Patent: Mar. 13, 2018

(54) RELUCTANCE MOTOR HAVING INDUCTOR POLE COILS LOCATED BETWEEN ADJACENT ONES OF THE SALIENT POLES OF A ROTOR

(71) Applicant: SUZUKI MOTOR CORPORATION, Hamamatsu-shi, Shizuoka (JP)

(72) Inventor: Masahiro Aoyama, Hamamatsu (JP)

(73) Assignee: SUZUKI MOTOR CORPORATION, Hamamatsu-Shi (JP)

( * ) Notice: Subject to any disclaimer, the term of this patent is extended or adjusted under 35 U.S.C. 154(b) by 247 days.

(21) Appl. No.: 14/204,568

(22) Filed: Mar. 11, 2014

(65) Prior Publication Data

US 2014/0285057 A1    Sep. 25, 2014

(30) Foreign Application Priority Data

Mar. 19, 2013  (JP) .................................. 2013-055860

(51) Int. Cl.
  *H02K 3/28*    (2006.01)
  *H02K 19/12*   (2006.01)
  (Continued)

(52) U.S. Cl.
  CPC ............... *H02K 3/28* (2013.01); *H02K 16/04* (2013.01); *H02K 19/12* (2013.01); *H02K 1/24* (2013.01);
  (Continued)

(58) Field of Classification Search
  CPC ............ H02K 1/24; H02K 3/28; H02K 3/527; H02K 16/04; H02K 19/12; H02K 11/0094;
  (Continued)

(56) References Cited

U.S. PATENT DOCUMENTS 8,847,455 B2     9/2014  Hiramoto et al. ............. 310/180
2007/0046131 A1  3/2007  Boebel et al. ................ 310/216
(Continued)

FOREIGN PATENT DOCUMENTS

CN    101874337 A    10/2010
JP    10-271781 A    10/1998
(Continued)

OTHER PUBLICATIONS

Chinese Office Action with search report dated Dec. 31, 2015, issued by the Chinese Patent Office in corresponding application 201410099364.X.
(Continued)

*Primary Examiner* — Bernard Rojas
*Assistant Examiner* — Rashad Johnson
(74) *Attorney, Agent, or Firm* — Stein IP, LLC

(57) ABSTRACT

A reluctance motor has: a stator provided with drive coils to which multiphase drive currents are inputted; and a rotor provided with a plurality of salient poles which receive primary rotating force when magnetic fluxes generated in the drive coils are interlinked with the rotor, and the rotor has: inductor pole coils which are placed on magnetic paths on which spatial harmonic components superimposed on the magnetic fluxes generated in the drive coils are interlinked with the rotor side so that induced currents can be generated in the inductor pole coils due to the spatial harmonic components of the magnetic fluxes; rectifier elements which rectify the induced currents generated in the inductor pole coils; and electromagnet coils as defined herein, and the inductor pole coils and the electromagnet coils do not serve for each other's purposes but are placed on the rotor individually.

2 Claims, 21 Drawing Sheets

(51) Int. Cl.
  *H02K 16/04*    (2006.01)
  *H02K 37/02*    (2006.01)
  *H02K 3/52*     (2006.01)
  *H02K 19/26*    (2006.01)
  *H02K 1/24*     (2006.01)
  *H02K 19/30*    (2006.01)
  *H02K 19/28*    (2006.01)
  *H02K 11/042*   (2016.01)
  *H02K 11/00*    (2016.01)
  *H02K 19/32*    (2006.01)

(52) U.S. Cl.
  CPC ............ *H02K 1/246* (2013.01); *H02K 3/527* (2013.01); *H02K 11/0094* (2013.01); *H02K 11/042* (2013.01); *H02K 19/26* (2013.01); *H02K 19/28* (2013.01); *H02K 19/30* (2013.01); *H02K 19/32* (2013.01); *H02K 37/02* (2013.01)

(58) Field of Classification Search
  CPC ...... H02K 11/042; H02K 19/28; H02K 19/30; H02K 19/32
  USPC ....... 310/68 D, 210, 51, 180, 183, 186, 190, 310/191, 198
  See application file for complete search history.

(56) References Cited

U.S. PATENT DOCUMENTS

| | | | | |
|---|---|---|---|---|
| 2010/0259136 A1* | 10/2010 | Hiramoto | ............... | H02K 1/223 310/68 D |
| 2011/0193444 A1* | 8/2011 | Maruyama | ............. | H02K 3/522 310/215 |
| 2012/0256510 A1* | 10/2012 | Yamada | ................. | H02K 19/12 310/184 |
| 2012/0313492 A1 | 12/2012 | Yamada et al. | ................ | 310/194 |
| 2013/0134823 A1* | 5/2013 | Yamada | ................... | H02K 1/24 310/216.004 |
| 2013/0241367 A1* | 9/2013 | Taniguchi | .......... | H02K 11/0094 310/68 D |
| 2013/0334937 A1* | 12/2013 | Yamada | ................. | H02K 19/10 310/68 D |
| 2014/0028160 A1* | 1/2014 | Yamada | ................. | H02K 19/12 310/68 B |
| 2016/0105062 A1* | 4/2016 | Aoyama | ................ | H02K 19/12 310/51 |
| 2016/0226356 A1* | 8/2016 | Nashiki | ................ | H02K 21/042 |
| 2016/0294239 A1* | 10/2016 | Yamada | ................. | H02K 16/04 |

FOREIGN PATENT DOCUMENTS

| | | |
|---|---|---|
| JP | 2005-124335 A | 5/2005 |
| JP | 2009-142120 A | 6/2009 |
| JP | 2010-22185 A | 1/2010 |
| JP | 2013-005555 A | 1/2013 |
| WO | WO 2012/110883 A2 | 8/2012 |

OTHER PUBLICATIONS

Sakutaro Nonaka, "Self-Excitation Type Single-Phase Synchronous Motor", IEEJ Transactions vol. 78 No. 842, Nov. 1958, p. 18-26.
Japanese Office dated Sep. 20, 2016, issued by the Japanese Patent Office in corresponding application JP 2013-055860.
German Office Action dated Jul. 24, 2017, issued to German Application No. 102014003658.8.

* cited by examiner

RELUCTANCE MOTOR HAVING INDUCTOR POLE COILS LOCATED BETWEEN ADJACENT ONES OF THE SALIENT POLES OF A ROTOR

CROSS-REFERENCE TO RELATED APPLICATIONS

This application claims the benefit of Japanese Application No. 2013-055860, filed Mar. 19, 2013, in the Japanese Patent Office. All disclosures of the document(s) named above are incorporated herein by reference.

BACKGROUND OF THE INVENTION

1. Field of the Invention

The present invention relates to a reluctance motor. Particularly, it relates to a reluctance motor which has a self-excitation function so as to achieve highly efficient rotation.

2. Description of the Related Art

Reluctance motors are mounted as drive sources on various kinds of drive devices. Each of the reluctance motors has a problem that it is difficult to obtain large torque when the reluctance motor is of a type using only reluctance torque, in comparison with a motor (electric motor) of a type which is driven by use of magnet torque generated by permanent magnets embedded on the rotor side.

Particularly, when a motor is mounted on a hybrid electric vehicle or an electric vehicle requiring large torque, the motor often uses an IPM (Interior Permanent Magnet) structure in which permanent magnets such as neodymium magnets having strong magnetic force are embedded in a V-shape in a rotor so that both magnet torque and reluctance torque can be used effectively.

For example, there has been proposed that a reluctance motor may use a self-excitation function as disclosed in Sakutaro Nonaka, "Self-Excitation Type Single-Phase Synchronous Motor", IEEJ Transactions Vol. 78 No. 842, November 1958, P. 18-26 to improve efficiency. It has been desired to improve characteristics such as torque in a reluctance motor which can be manufactured inexpensively as an on-vehicle motor.

In the self-excitation system disclosed in Sakutaro Nonaka, "Self-Excitation Type Single-Phase Synchronous Motor", IEEJ Transactions Vol. 78 No. 842, November 1958, P. 18-26, magnetic fluxes having a higher frequency than the fundamental frequency of drive currents supplied to stator-side drive coils are interlinked with the rotor side to generate induced currents in self-excitation coils disposed on the rotor side. In the self-excitation system, the induced currents are half-wave rectified and then supplied (returned) to the self-excitation coils so that the self-excitation coils can also serve as electromagnet coils.

However, in the self-excitation function disclosed in Sakutaro Nonaka, "Self-Excitation Type Single-Phase Synchronous Motor", IEEJ Transactions Vol. 78 No. 842, November 1958, P. 18-26, the self-excitation coils serve also as the electromagnet coils. Accordingly, magnetic interference takes place so that the induced currents cannot be generated efficiently but electromagnetic force generated thus is also weakened.

In addition, in the structure disclosed in Sakutaro Nonaka, "Self-Excitation Type Single-Phase Synchronous Motor", IEEJ Transactions Vol. 78 No. 842, November 1958, P. 18-26, the self-excitation coils are disposed up to deep portions isolated from an outer surface of the rotor. High frequency components (spatial harmonic components) of the magnetic fluxes cannot reach (interlink with) the deep portions of the rotor but only very small induced currents can be generated in the self-excitation coils.

Incidentally, a self-excitation type motor has been proposed also in JP-A-10-271781. However, it has the same problem because induced currents cannot be generated efficiently in the same manner.

In addition, it has been proposed in JP-A-2010-22185 that high frequency currents are separately inputted to stator-side coils to generate excitation currents in rotor-side self-excitation coils. However, it is necessary to input excitation energy from the outside so that drive with high efficiency cannot be expected (lowering in the efficiency cannot be avoided).

SUMMARY OF THE INVENTION

Therefore, an object of the invention is to provide a reluctance motor which can collect loss energy to achieve the function of self-excitation and which can be rotated with high efficiency to thereby achieve improvement in torque.

As a first aspect of the invention is directed to a reluctance motor comprising: a stator provided with drive coils to which multiphase drive currents are inputted; and a rotor provided with a plurality of salient poles which receive primary rotating force when magnetic fluxes generated in the drive coils are interlinked with the rotor, wherein: the rotor has: inductor pole coils which are placed on magnetic paths on which spatial harmonic components superimposed on the magnetic fluxes generated in the drive coils are interlinked with the rotor side so that induced currents can be generated in the inductor pole coils due to the spatial harmonic components of the magnetic fluxes; rectifier elements which rectify the induced currents generated in the inductor pole coils; and electromagnet coils to which the induced currents rectified by the rectifier elements are conducted as field currents so that the electromagnet coils can be self-excited to thereby generate electromagnetic force as auxiliary rotating force for assisting the primary rotating force, and the inductor pole coils and the electromagnet coils do not serve for each other's purposes but are placed on the rotor individually.

A second aspect of the invention is characterized in that the inductor pole coils are placed between adjacent ones of the salient poles of the rotor.

A third aspect of the invention is characterized in that each of the inductor pole coils has a structure which is magnetically independent of constituent materials other than the inductor pole coil including a core material on which the inductor pole coil is wound.

A fourth aspect of the invention is characterized in that core materials on which the inductor pole coils are wound are made of a magnetic substance.

A fifth aspect of the invention is characterized in that a ratio of a number P of the salient poles of the rotor to a number S of slots in which the drive coils of the stator are placed is set in P/S=2/3.

Thus, according to the first aspect of the invention, magnetic fluxes generated in the stator-side coils are interlinked with the rotor-side salient poles to generate primary rotating force. At the same time, spatial harmonic components superimposed on the magnetic fluxes are interlinked with the rotor-side inductor pole coils to generate induced currents. The induced currents are rectified by rectifier elements and supplied (conducted) as field currents to the electromagnet coils so that electromagnetic forces (magnetic fluxes) can be generated in the electromagnet coils to work with the magnetic fluxes from the stator side. Thus, auxiliary rotating force for assisting the primary rotating force can be generated to rotate the rotor side.

Accordingly, it is not necessary to separately supply energy to the rotor-side electromagnet coils. Spatial harmonic components of the magnetic fluxes (which cause generation of iron loss) which cannot be used effectively in the background art can be collected to rotate the rotor with high efficiency. On this occasion, the same currents can be prevented from flowing into the inductor pole coils and the electromagnet coils and interfering with each other so that loss can be avoided. As a result, loss energy can be effectively collected to improve the torque of the reluctance motor.

According to the second aspect of the invention, the spatial harmonic components of the magnetic fluxes from the stator can be efficiently interlinked with the inductor pole coils which are located adjacently to the salient poles, i.e. on the outer circumferential surface side of the rotor, so that the spatial harmonic components of the magnetic fluxes can be efficiently collected to self-excite the inductor pole coils effectively to thereby supply large-capacity field currents to the electromagnet coils. Accordingly, a highly efficient self-excitation function can be constructed with a simple structure.

According to the third aspect of the invention, it is possible to prevent the magnetic fluxes generated around the inductor pole coils from interfering with each other so that it is possible to prevent self-excitation from being impeded. In addition, it is possible to prevent the existence of the inductor pole coils from being a factor causing reduction of the salient pole ratio. Accordingly, it is possible to achieve improvement in the torque generated due to the self-excitation effectively while avoiding reduction in reluctance torque.

According the fourth aspect of the invention, it is possible to increase the magnetic permeability inside the inductor pole coils so that it is possible to interlink magnetic fluxes of the spatial harmonic components from the stator with the inductor pole coils efficiently. Accordingly, it is possible to improve the collection rate of the loss energy. Thus, it is possible to improve the torque of the reluctance motor more effectively.

According to the fifth aspect of the invention, it is possible to optimize the ratio of the number P of salient poles of the rotor to the number S of slots of the stator so that the magnetic flux density can be distributed evenly to suppress electromagnetic vibration of the stator. Accordingly, it is possible to reduce energy loss caused by the electromagnetic vibration and it is possible to collect loss energy efficiently. Due to the reduction of the electromagnetic vibration, it is also possible to suppress electromagnetic noise.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

Figure 1:
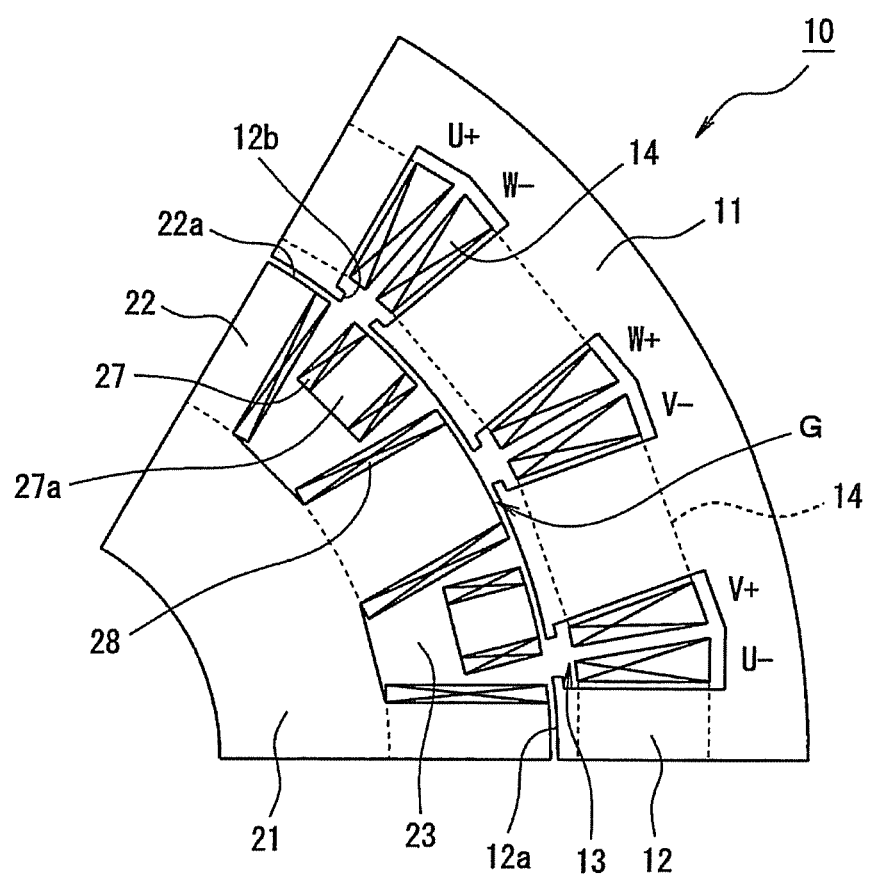
FIG. 1 is a partially enlarged radially sectional view showing a schematic configuration of an embodiment of a reluctance motor according to the invention.

REFERENCE SIGNS LIST 10 reluctance motor
11 stator
12 stator teeth
12b collar portion
13, 23 slot
14 drive coil
21 rotor
22 rotor teeth
27, 27A, 27B inductor pole coil
27a core material
28, 28A, 28B electromagnet coil
29, 29A, 29B diode

DETAILED DESCRIPTION OF THE EMBODIMENTS

Figure 2:
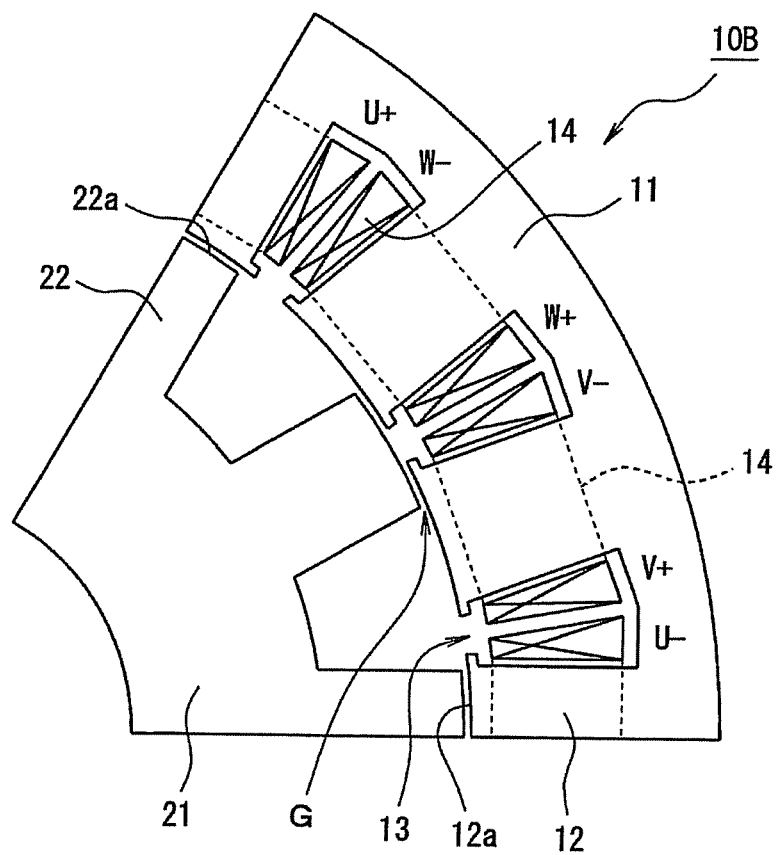
FIG. 2 is a partially enlarged radially sectional view showing a schematic configuration of a basic structure of the embodiment.
Figure 3:
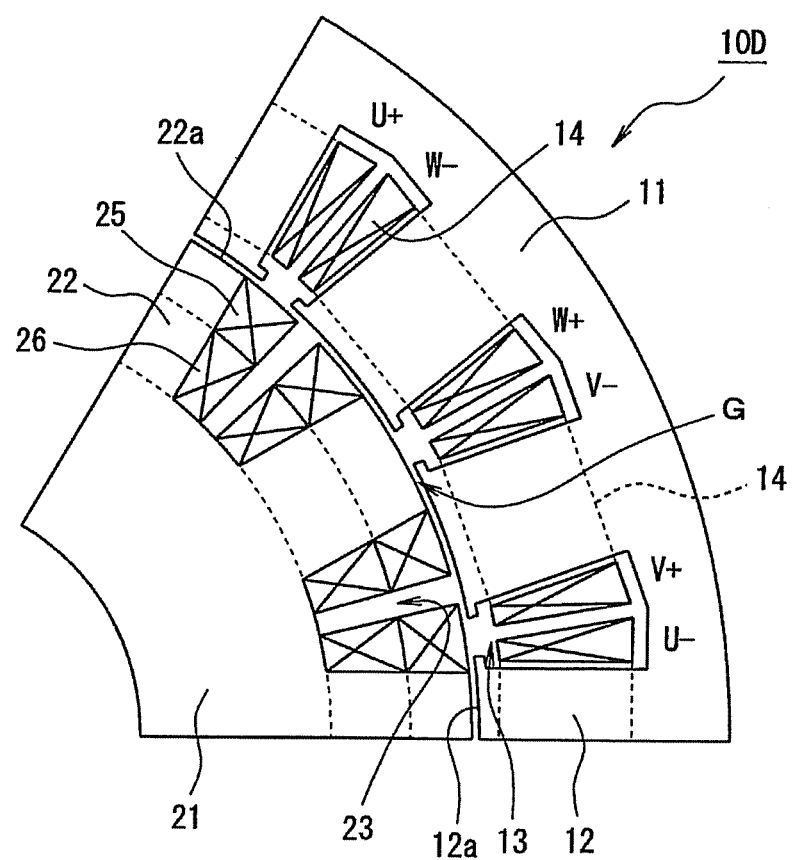
FIG. 3 is a partially enlarged radially sectional view showing a schematic configuration of an unimproved prototype structure according to the embodiment.

An embodiment of the invention will be described in detail below with reference to the drawings. FIGS. 1 to 21 are views for explaining an embodiment of a reluctance motor according to the invention. FIGS. 1 to 3 are radially sectional views of reluctance motors, each of which is depicted correspondingly to a mechanical angle of 60° around the axis thereof. The reluctance motor is manufactured to have a structure in which the depicted part corresponding to the mechanical angle of 60° is repeated periodically circumferentially.

In FIG. 1, a reluctance motor 10 starts at a reluctance motor 10B having a basic structure shown in FIG. 2 and uses a structure in which the problem inherent in a reluctance motor 10D shown in FIG. 3 and developed from the reluctance motor 10B can be solved. For example, the reluctance motor 10 has suitable performance when it is mounted as a drive source similar to an internal combustion engine on a vehicle or inside a wheel in a hybrid car or an electric car. Incidentally, each of the reluctance motors 10, 10B and 10D described herein is manufactured in a different way from that in JP-A-2010-22185 and to have a structure in which energy does not have to be supplied to a rotor from the outside.

(Basic Structure of Reluctance Motor)

First, as shown in FIG. 2, the reluctance motor 10B has a stator 11 which is formed substantially into a cylindrical shape, and a rotor 21 which is received inside the stator 11 rotatably so that a rotary shaft of the rotor 21 can be fixed in alignment with the axis.

In the stator 11, a plurality of stator teeth 12 each formed into the shape of a salient pole extending radially are disposed circumferentially equally so that inner circumferential surfaces 12a can be opposed to outer circumferential surfaces 22a of the rotor 21 (rotor teeth 22) through a gap G. On each stator tooth 12, three-phase windings corresponding to three phases are wound individually and concentratedly to form a drive coil 14 by use of a slot 13 which is a space formed between the side surface of the stator tooth 12 and the side surface of another adjacent thereto. The stator tooth 12 serves as an electromagnet which generates magnetic flux for rotating the rotor 21 received inside oppositely to the stator tooth 12 when a drive current is supplied to the drive coil 14.

In the rotor 21, a plurality of rotor teeth (salient poles) 22 each formed into the shape of a salient pole extending radially are disposed circumferentially equally in the same manner as the stator teeth 12. The rotor teeth 22 are formed to be different in total circumferential number from the stator teeth 12 so that the outer circumferential surfaces 22a of the rotor teeth 22 can be suitably and closely opposed to the inner circumferential surfaces 12a of the stator teeth 12 when the rotator teeth 22 rotate relatively thereto.

Thus, in the reluctance motor 10B, magnetic fluxes generated due to electricity conducted to the drive coils 14 inside the slots 13 of the stator 11 can be interlinked from the inner circumferential surfaces 12a of the stator teeth 12 to the opposed outer circumferential surfaces 22a of the rotor teeth 22. The rotor 21 can be rotated relatively by the effect of reluctance torque (primary rotating force) which wants to make shortest magnetic paths through which the magnetic fluxes pass. As a result, by the reluctance motor 10B, the electric energy inputted as electricity conducted from the rotary shaft integrally rotating with the rotor 21 rotating relatively inside the stator 11 can be outputted as mechanical energy.

In this reluctance motor 10B, magnetic fluxes contributing to the torque cannot be generated inside the rotor 21, but spatial harmonic components are superimposed on the magnetic fluxes interlinked from the inner circumferential surfaces 12a of the stator teeth 12 to the outer circumferential surfaces 22a of the rotor teeth 22. Therefore, by use of the change in the magnetic flux densities of the spatial harmonic components of the magnetic fluxes interlinked from the stator 11 side to the rotor 21 side, induced currents can be generated in built-in coils to thereby obtain electromagnetic forces.

In detail, driving power of the fundamental frequency is supplied to the drive coils 14 of the stator 11 on this occasion to rotate the rotor 21 (rotor teeth 22) by main magnetic fluxes varying with the fundamental frequency. Accordingly, even when coils are simply disposed on the rotor 21 side, there is no change in the interlinkage magnetic fluxes. Thus, no induced currents are generated.

On the other hand, the spatial harmonic components superimposed on the magnetic fluxes are interlinked from the outer circumferential surfaces 22a to the rotor teeth 22 while varying temporally in a different cycle from the fundamental frequency. Therefore, the spatial harmonic components superimposed on the magnetic fluxes of the fundamental frequency can generate induced currents efficiently in the coils disposed in the vicinities of the outer circumferential surfaces 22a of the rotor teeth 22 without any separate input. As a result, the spatial harmonic magnetic fluxes which may cause iron loss can be collected as energy for self-excitation.

(Improved Structure of Reluctance Motor)

As shown in FIG. 3, in the reluctance motor 10D, windings are wound on each rotor tooth 22 using a slot 23 which is a space formed between the side surface of the rotor tooth 22 and the side surface of another adjacent thereto. Due to the concentrated windings formed thus in two stages in the radial direction, each inductor pole coil 25 and each electromagnet coil 26 are disposed.

The inductor pole coils 25 are placed on the sides of the outer circumferential surfaces 22a of the rotor teeth 22. The electromagnet coils 26 are placed on the axial side of the rotor teeth 22. The inductor pole coils 25 and the electromagnet coils 26 are connected and operated in cooperation with each other so as to serve as a circuit configuration similar to that in FIG. 4 which will be described later. Incidentally, in the reluctance motor 10D, the inductor pole coils 25 correspond to inductor pole coils 27A and 27B respectively in FIG. 4 and the electromagnet coils 26 correspond to electromagnet coils 28A and 28B respectively likewise.

The inductor pole coils 25 generate induced currents due to the spatial harmonic components (the change in the magnetic flux densities) of the magnetic fluxes interlinked from the inner circumferential surfaces 12a of the stator teeth 12 to the outer circumferential surfaces 22a of the rotor teeth 22 and supply the induced currents to the electromagnet coils 26. The electromagnet coils 26 are self-excited by the induced currents received from the inductor pole coils 25 and serving as field currents. Thus, magnetic fluxes (electromagnetic forces) can be generated.

In this manner, in the reluctance motor 10D, the electromagnet coils 26 receiving the induced currents flowing into the inductor pole coils 25 can generate magnetic fluxes due to the spatial harmonic components of the magnetic fluxes so that the generated magnetic fluxes can be interlinked from the outer circumferential surfaces 22a of the rotor teeth 22 to the inner circumferential surfaces 12a of the stator teeth 12. Therefore, reluctance torque (auxiliary rotating force) which wants to make shortest magnetic paths through which the other interlinkage magnetic fluxes than the magnetic fluxes of the drive coils 14 generating the primary rotating force pass can be obtained so as to assist relative rotation of the rotor 21.

As a result, the reluctance motor 10D can collect, as energy, the spatial harmonic components of the magnetic fluxes which cause loss in the reluctance motor 10B. For example, the steady torque in the reluctance motor 10D can be improved by about 31.9% as compared with that in the reluctance motor 10B in the case where the reluctance motor 10D and the reluctance motor 10B are driven with the same stator structure under the same drive conditions (rotational speed, current value and current phase angle). In addition, torque ripple in the reluctance motor 10D can be reduced (see FIG. 9 which will be described later).

Sakutaro Nonaka, "Self-Excitation Type Single-Phase Synchronous Motor", IEEJ Transactions Vol. 78 No. 842, November 1958, P. 18-26 has also proposed an improved structure of the reluctance motor 10B. According to the self-excitation technique disclosed in Sakutaro Nonaka, "Self-Excitation Type Single-Phase Synchronous Motor", IEEJ Transactions Vol. 78 No. 842, November 1958, P. 18-26, coils are wound on the rotor teeth 22 so that magnetic fluxes with a higher frequency than the fundamental frequency can be interlinked with the rotor-side coils to thereby generate induced currents. The induced currents are half-wave rectified by rectifier elements (diodes) and returned. In this manner, the rotor-side coils serve as self-excitation type electromagnets.

However, the self-excitation technique disclosed in Sakutaro Nonaka, "Self-Excitation Type Single-Phase Synchronous Motor", IEEJ Transactions Vol. 78 No. 842, November 1958, P. 18-26 has the following problems.

1. Since the rotor-side coils serve both as coils for generating induced currents and as coils for applying rectified induced currents as field currents, magnetic interference occurs so that the induced currents cannot be generated efficiently and magnetomotive force also becomes extremely small.

2. The high-order harmonic components of magnetic fluxes with a higher frequency than the fundamental frequency are merely distributed in the vicinities of the outer circumferential surfaces 22a even when the magnetic fluxes are interlinked with the rotor 21 (rotor teeth 22). Accordingly, when coils are placed on the axial side, only very small induced currents can be generated. Incidentally, it is practically impossible to place the rotor-side coils in the vicinities of the outer circumferential surfaces 22a of the rotor teeth 22. For example, even when an extremely small amount of a conductor wire having a thin wire diameter is wound as each coil, the conductor resistance of the coil increases to increase copper loss. Thus, it is difficult to function the coil as an efficient electromagnet. In addition, there is also a concern that the surface of the rotor may touch the stator side.

3. When the coils on the stator 11 side are formed as distributed windings, there is a tendency that high-order harmonics are superimposed on the magnetic fluxes so that only smaller induced currents can be expected due to the high-order harmonic components of the magnetic fluxes, as described above. In brief, as for how to wind the coils, the distributed windings are not appropriate.

4. Sakutaro Nonaka, "Self-Excitation Type Single-Phase Synchronous Motor", IEEJ Transactions Vol. 78 No. 842, November 1958, P. 18-26 has suggested that the rotor-side coils are excited with the harmonic magnetic fluxes twice as high as the fundamental frequency. Troughs appear when induced currents generated due to second harmonic magnetic fluxes are rectified and combined (see FIG. 8 which will be described later). In addition, since the induced currents become larger currents with the increase of temporal change in the magnetic fluxes, harmonic magnetic fluxes whose order is not too high but around the third are advantageous.

(Basic Structure of Reluctance Motor 10 According to the Embodiment)

Now return to FIG. 1. In the reluctance motor 10 according to the embodiment, concentrated windings in which three-phase windings corresponding to three phases are wound on each stator tooth 12 individually are used in each slot 13 on the stator 11 side to thereby form a drive coil 14 serving as an electromagnet, as shown in FIG. 3. In the reluctance motor 10, the inductor pole coils 25 of the reluctance motor 10D are replaced by inductor pole coils 27 and the electromagnet coils 26 are replaced by electromagnet coils 28.

In addition, on the rotor 21 side, each inductor pole coil 27 concentratedly wound on each core material 27a is entirely received inside each slot 23 and concentrated winding of one stage is formed all over each rotor tooth 22 so as to place each electromagnet coil 28. The core material 27a in which electromagnetic steel sheets (magnetic substance) are laminated is used for the inductor pole coil 27. Accordingly, the magnetic permeability is increased so that the magnetic fluxes can be interlinked with high density. The inductor pole coils 27 are opposed to the inner circumferential surfaces 12a of the stator teeth 12 through an extremely small air gap G. Thus, more spatial harmonic magnetic fluxes can be interlinked. Magnetic field analysis is made to strictly check spatial harmonic magnetic paths so that the inductor pole coils 27 can effectively use third spatial harmonic components of the magnetic fluxes interlinked from the inner surface surfaces 12a of the stator teeth 12 to the outer surface surfaces 22a of the rotor teeth 22. Thus, the inductor pole coils 27 are placed so that induced currents can be generated efficiently. Incidentally, each inductor pole coil 27 is placed to be located between adjacent ones of the rotor teeth 22 so as to secure a necessarily sufficient gap between the inductor pole coil 27 and the corresponding electromagnet coil 28.

When the concentrated winding structure is used in this manner, each inductor pole coil 27 and each electromagnet coil 28 as a whole can be miniaturized without the necessity of circumferential windings over a plurality of slots. In addition, the inductor pole coils 27 can reduce copper loss on the primary side and efficiently generate induced currents due to interlinkage of the third spatial harmonic magnetic fluxes which are low in order. Thus, collectable loss energy can be increased.

In addition, due to the use of the third spatial harmonic magnetic fluxes, induced currents can be generated more effectively in the inductor pole coils 27 than in the case where second spatial harmonic magnetic fluxes are used as described in Sakutaro Nonaka, "Self-Excitation Type Single-Phase Synchronous Motor", IEEJ Transactions Vol. 78 No. 842, November 1958, P. 18-26. Specifically, due to the use of the third spatial harmonic magnetic fluxes, as compared with the use of the second spatial harmonic magnetic fluxes, the temporal change in the magnetic fluxes can be increased to increase the induced currents to thereby collect the loss energy thereof more efficiently. In the structure of Sakutaro Nonaka, "Self-Excitation Type Single-Phase Synchronous Motor", IEEJ Transactions Vol. 78 No. 842, November 1958, P. 18-26, coils wound on axially deep portions of the rotor are illustrated but there is no consideration about the regions where the spatial harmonics are interlinked and the spatial harmonics cannot be used effectively.

Each inductor pole coil 27 is placed in each slot 23 between adjacent ones of the outer circumferential surfaces 22a of the rotor teeth 22 so as to be magnetically independent. Each electromagnet coil 28 is wound all over the whole length of each rotor tooth 22 so that the whole of the electromagnet coil 28 can be effectively used to generate magnetic flux. The induced pole coil 27 and the electromagnet coil 28 are divided thus to prevent magnetic flux paths from interfering with each other, so that magnetic interference can be reduced to generate induced currents efficiently. In addition, the induced pole coils 27 and the electromagnet coils 28 can function effectively as electromagnets to generate magnetic fluxes.

The inductor pole coils 27 are formed into concentrated windings as the same circumferential windings with respect to the radial direction of the rotor 21. The inductor pole coils 27 are arranged in the circumferential direction of the rotor 21 so as to be connected in parallel. The electromagnet coils 28 are formed into concentrated windings as circumferential windings so that adjacent ones of the electromagnet coils 28 can be wound in opposite directions to each other with respect to the radial direction of the rotor 21. All the electromagnet coils 28 are connected in series so that each portion on the outer circumferential side of the rotor 21 and each portion on the axial side of the rotor 21 are connected alternately.

Figure 4:
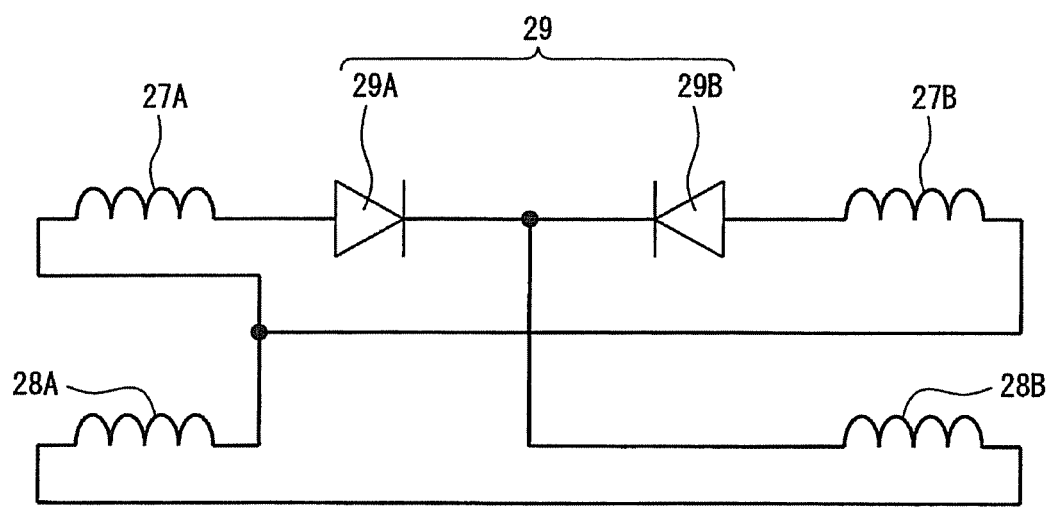
FIG. 4 is a circuit diagram of a simple model for explaining, in an easily understood way, a circuit configuration in which inductor pole coils and electromagnet coils are connected through diodes.

As shown in FIG. 4, opposite end portions of the series connection in which all the electromagnet coils 28 are connected in series are connected to opposite end portions of the inductor pole coils 27 (27A and 27B) connected in parallel, respectively through the diodes 29 (29A and 29B). Even when the inductor pole coils 27 and the electromagnet coils 28 (28A and 28B) are multipolarized, the number of the diodes 29 to be used can be suppressed due to the series connection in which all the electromagnet coils 28 are connected in series. In order to avoid use of a large number of the diodes 29, the diodes 29 do not form a general H-bridge type full-wave rectifier circuit but forms a neutral point clamp type half-wave rectifier circuit in which each pair of the diodes 29 are connected with a phase difference of 180° so that an induced current outputted by one of the pair can be inverted and half-wave rectified.

Thus, in the reluctance motor 10, the spatial harmonic components of the magnetic fluxes interlinked from the inner circumferential surfaces 12a of the stator teeth 12 to the outer circumferential surfaces 22a of the rotor teeth 22 are allowed to pass through the core materials 27a made of electromagnetic steel sheets with high magnetic permeability and without interference with the electromagnet coils 28 (without reduction of the induced currents) so that the induced pole coils 27 can generate and collect induced currents efficiently. The induced currents generated in the inductor pole coils 27 respectively are rectified by the diodes 29 and then joined so as to flow into the electromagnet coils 28 which are connected in series, respectively. Thus, the electromagnet coils 28 can be self-excited effectively to generate large magnetic fluxes (electromagnetic forces).

As a result, in the reluctance motor 10, the magnetic fluxes which would be weakened due to interference with each other in the reluctance motor 10D can be smoothened and used effectively by the inductor pole coils 27 and the electromagnet coils 28 which are divided independently for the excitation purpose and for the electromagnet purpose so that the magnetic fluxes can be collected and outputted as energy efficiently.

In addition, the inductor pole coils 27 and the electromagnet coils 28 are placed in the circumferential direction of the rotor 21 and multipolarized. Accordingly, in comparison with the case of a bipolar motor described in Sakutaro Nonaka, "Self-Excitation Type Single-Phase Synchronous Motor", IEEJ Transactions Vol. 78 No. 842, November 1958, P. 18-26, the amount of magnetic flux interlinked with each rotor tooth 22 can be dispersed circumferentially and electromagnetic force (reluctance torque) acting on the individual rotor tooth 22 can be also circumferentially dispersed to thereby suppress electromagnetic vibration. Thus, the reluctance motor 10 can be made more silent.

(Specific Structure of Reluctance Motor 10 According to the Embodiment)

The inductor pole coils 27 and the electromagnet coils 28, including the drive coils 14, are formed as windings using a wire material made of a copper conductor. The use of the copper conductor increases the electric conductivity and reduces loss so that induced currents can be generated efficiently and used as field currents. When the copper conductor is used as the wires of the coils 27, 28 and 14, it is preferable that rectangular conductor wires are used so that copper loss or thermal loss caused by coil resistance can be reduced. Further, when the coils 27, 28 and 14 are formed as edgewise coils wound vertically to thereby set the short side on the inner diameter surface side, the distributed capacitance (stray capacitance) can be reduced to improve the frequency characteristic. In addition, since the length of the circumference of the wire material is long, it is possible to suppress resistance increase caused by a skin effect so that it is possible to suppress the efficiency from lowering. As a result, more loss energy can be collected by the coils 27, 28 and 14 with a small amount of the copper conductor. Incidentally, the wire material of the coils 27, 28 and 14 is not limited to the copper conductor but may be selected in accordance with any other purpose. For example, a conductor bar of aluminum whose specific gravity is ⅓ as high as that of copper may be used to reduce the weight.

In the stator 11, the inner circumferential surfaces 12*a* of the stator teeth 12 are protruded both forward and backward circumferentially so as to form collar portions 12*b* in the open-type slots 13. Thus, spatial harmonic magnetic fluxes can be interlinked with the interiors of the inductor pole coils 27 efficiently.

The inductor pole coils 27 may be fixed on the rotor 21 side together with the core materials 27*a* by a non-magnetic substance such as a resin with which the electromagnet coils 28 are retained on the rotor teeth 22. Incidentally, the inductor pole coils 27 may be structured to be fastened axially together with the core materials 27*a* by a fastening end plate for fastening the axially opposite end portions of the rotor 21 or the core materials 27*a* may be supported by bolts made of a non-magnetic substance.

In the reluctance motor 10, for example, each inductor pole coil 27 is formed by 10 turns of winding of a rectangular copper wire measuring 2.0 mm by 1.0 mm and each electromagnet coil 28 is formed by 20 turns of winding of a rectangular copper wire measuring 2.0 mm by 1.0 mm. In the reluctance motor 10D, for example, each inductor pole coil 25 is formed by 45 turns of winding which is circular in section with a diameter of 1 mm and each electromagnet coil 26 is formed by 48 turns of winding which is circular in section with a diameter of 1 mm.

Figure 5:
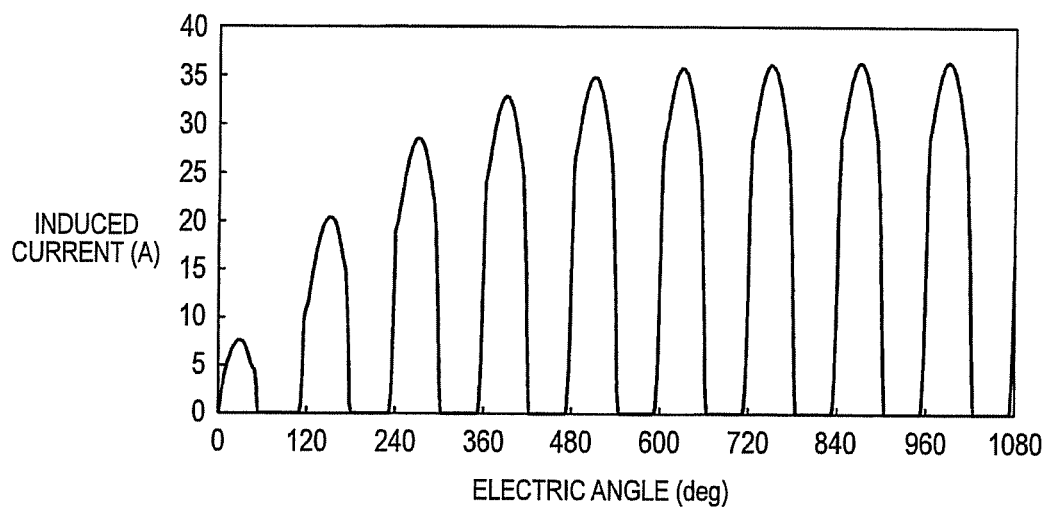
FIG. 5 is a graph showing the waveform of an induced current which is extracted from one inductor pole coil in the circuit shown in FIG. 4.
Figure 6:
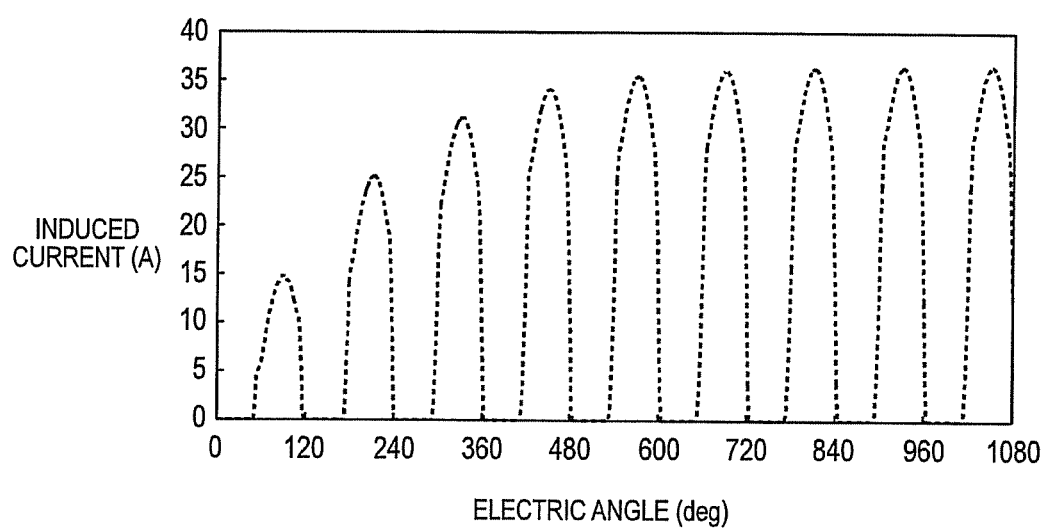
FIG. 6 is a graph showing the waveform of an induced current extracted from the other inductor pole coil than the inductor pole coil in FIG. 5 in the circuit shown in FIG. 4 and inverted.
Figure 7:
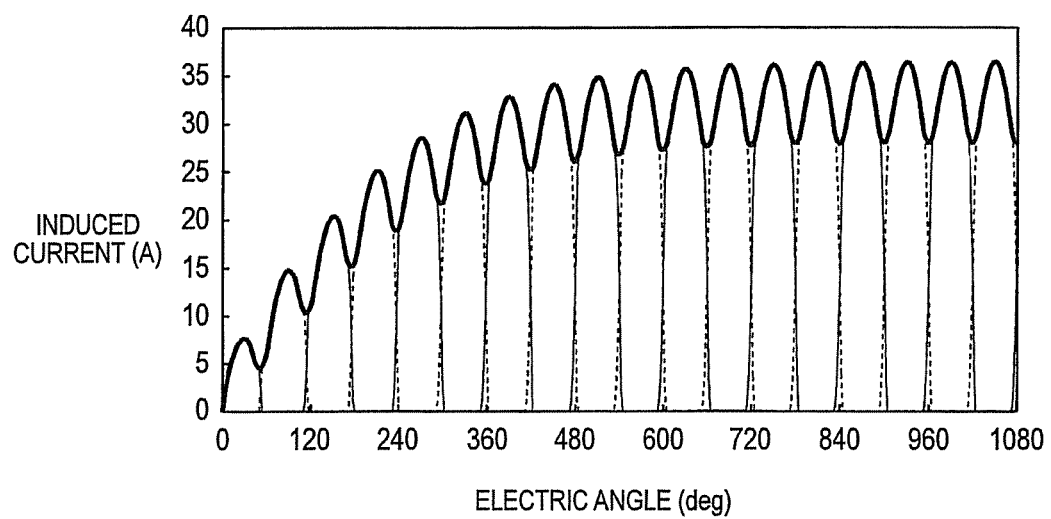
FIG. 7 is a graph showing a synthetic waveform in which the induced currents in FIGS. 5 and 6 are combined.

In the reluctance motor 10, currents having the current waveforms shown in FIGS. 5 to 7 flow into the inductor pole coils 27A and 27B and the electromagnet coils 28A and 28B shown in the simple model of FIG. 4. In the reluctance motor 10D, currents having the same current waveforms as those flowing into the inductor pole coils 27A and 27B and the electromagnet coils 28A and 28B flow into the inductor pole coils 25 and the electromagnet coils 26 correspondingly.

In detail, the induced current generated in the inductor pole coil 27A is half-wave rectified by the diode 29A and supplied to the downstream side, as shown in FIG. 5. The induced current generated in the inductor pole coil 27B is hale-wave rectified and inverted by the diode 29B and supplied to the downstream side, as shown in FIG. 6. Since the electromagnet coils 28A and 28B are connected in series, a combined wave of the induced currents shown in FIG. 5 and FIG. 6 can flow as a field current into each of the electromagnet coils 28A and 28B so that the electromagnet coils 28A and 28B can serve as electromagnets. In brief, the inductor pole coils 27 (25) collect as energy sources the spatial harmonics of the magnetic fluxes causing loss in the background art, and the electromagnet coils 28 (26) effectively use the collected energy to generate magnetic fluxes. The magnetic fluxes generated thus are added to the magnetic fluxes generated in the drive coils 14 of the stator 11 to thereby efficiently rotate the rotor 21.

Figure 8:
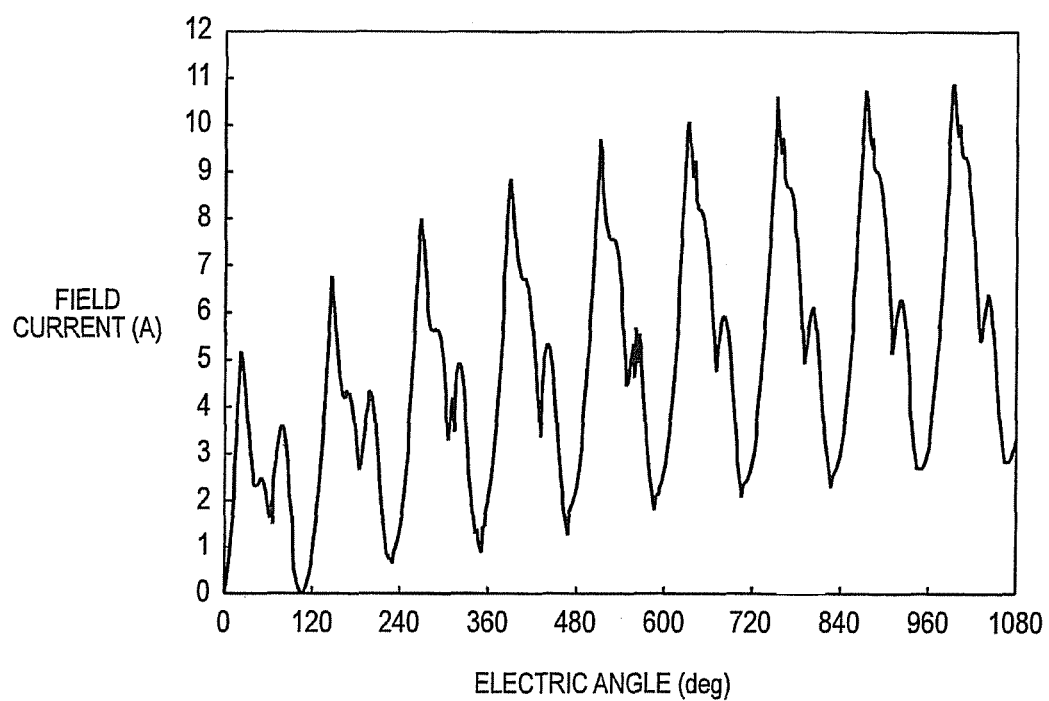
FIG. 8 is a graph showing the waveform of an induced current generated in each induced pole coil in the reluctance motor having the unimproved prototype structure shown in FIG. 3.
Figure 9:
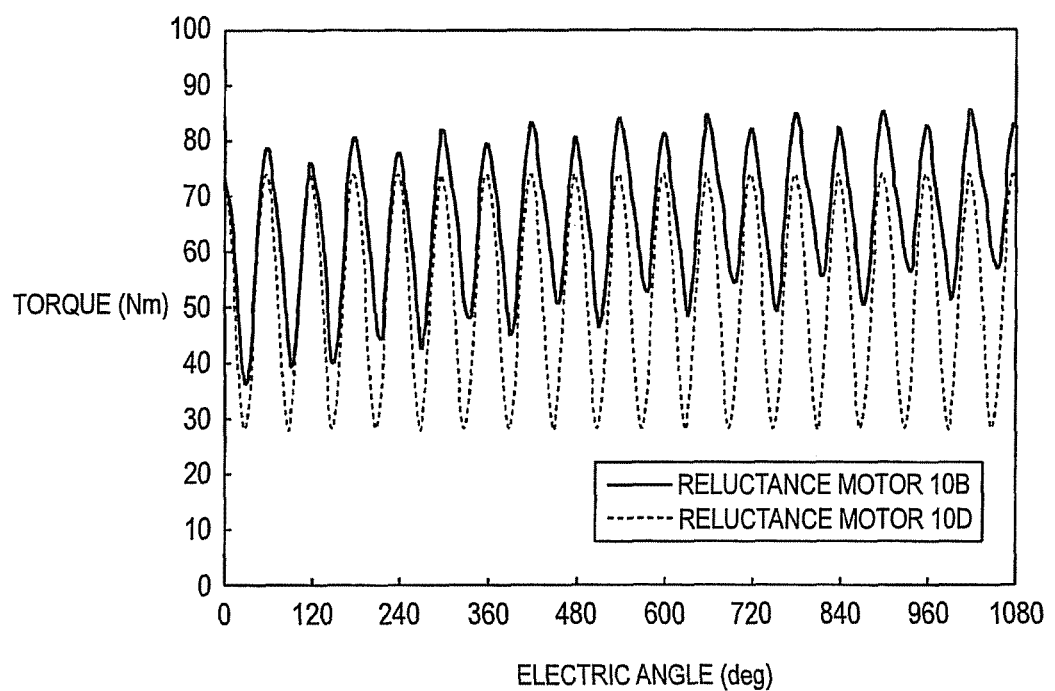
FIG. 9 is a graph showing torque obtained from the reluctance motor having the basic structure shown in FIG. 2 and torque obtained from the reluctance motor having the unimproved prototype structure shown in FIG. 3 using the induced current shown in FIG. 8.

The reluctance motor 10D can generate field currents in the electromagnet coils 26, as shown in FIG. 8. Therefore, in comparison with the reluctance motor 10B, as shown in FIG. 9, the reluctance motor 10D can improve the torque characteristic to add reluctance toque derived from electromagnetic forces (magnetic fluxes) generated in the electromagnet coils 26 to the same reluctance torque as that in the reluctance motor 10B.

In the reluctance motor 10D, as shown in FIG. 8, it has been proved that field currents generated in the electromagnet coils 26 have, as main components, third harmonics in which pulsation is observed three times at each electric angle period and it has been proved that the induced currents generated in the inductor pole coils 25 are mainly derived from the third spatial harmonic magnetic fluxes.

Figure 10:
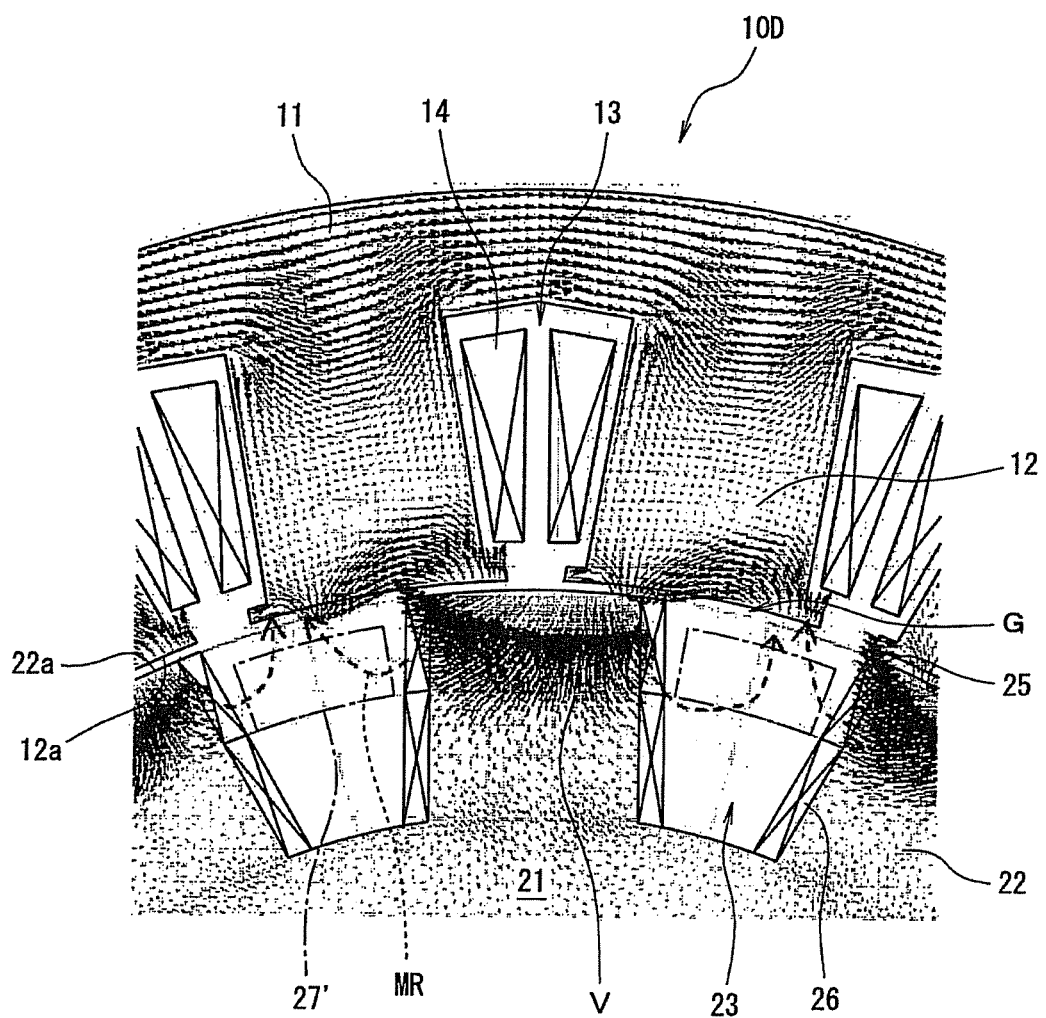
FIG. 10 is a conceptual diagram showing the distribution of spatial harmonic magnetic flux density in the reluctance motor having the unimproved prototype structure shown in FIG. 3 in vector representation.

From this fact, when the magnetic flux density distribution is displayed in vector representation based on magnetic analysis performed on the magnetic paths of the third spatial harmonic magnetic fluxes in the reluctance motor 10D, as shown in FIG. 10, it can be confirmed that magnetic flux vectors V are concentrated near the outer circumferential surfaces 22*a* of the rotor teeth 22 on the rotor 21 side. Judging from the magnetic flux vectors V in the interiors of the rotor teeth 22, it can be also understood that the third spatial harmonic magnetic fluxes pass through spatial magnetic paths MR, which are indicated by the broken line arrows in FIG. 10, in the slots 23 and return to the stator teeth 12 side.

Therefore, in the reluctance motor 10, each of inductor pole coils 27' is placed in a location shown in FIG. 10 in each of the slots 23 between adjacent ones of the rotor teeth 22 so that third spatial harmonic magnetic fluxes can be interlinked with the inductor pole coils 27' effectively.

Figure 11:
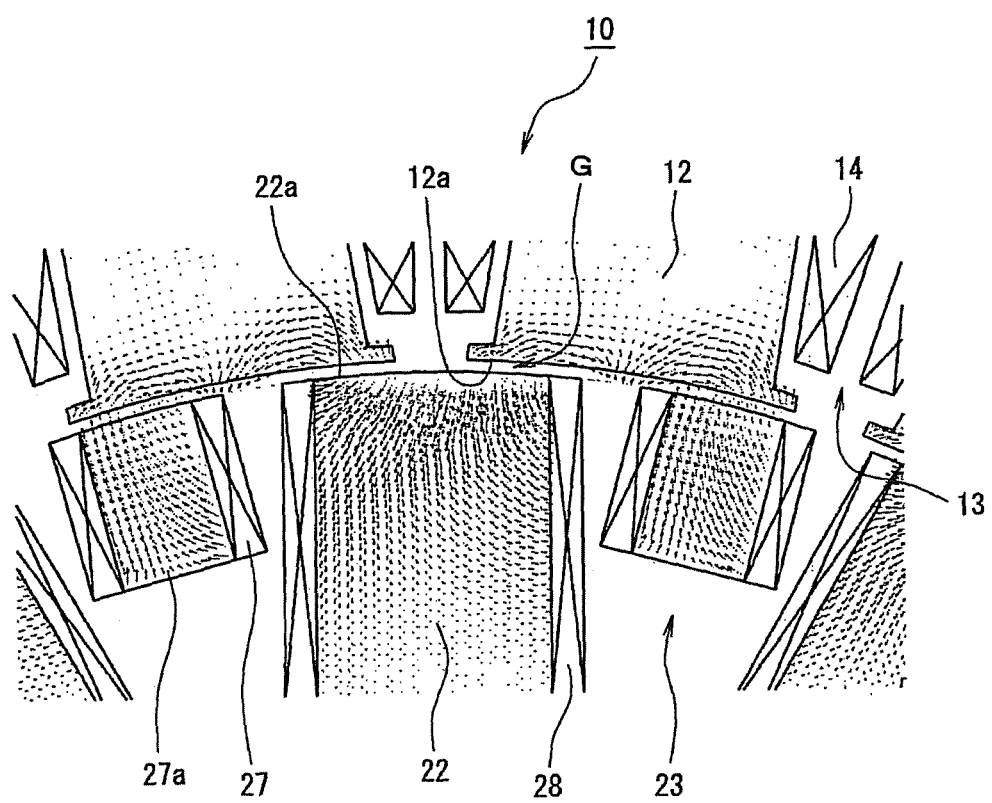
FIG. 11 is a conceptual view showing the distribution of spatial harmonic magnetic flux density in the reluctance motor according to the embodiment shown in FIG. 1 in vector representation.

When the magnetic flux density distribution of the third spatial harmonic magnetic fluxes is displayed in vector representation in the same manner in the reluctance motor 10 according to the embodiment, it is understood that the third spatial harmonic magnetic fluxes (magnetic flux vectors V) can be interlinked with all the rotor teeth 22 on the rotor 21 side and all the inductor pole coils 27, as shown in FIG. 11. In addition, it is understood that all the stator teeth 12 are also used as magnetic paths on the stator 11 side so that the third spatial harmonic magnetic fluxes can be interlinked with the rotor 21 side through the dispersed magnetic paths.

In this manner, the third spatial harmonic magnetic fluxes are not close to magnetic saturation, but the interlinkage of the third spatial harmonic magnetic fluxes through the air gap G can be prevented from being suppressed. Thus, the third spatial harmonic magnetic fluxes can be more interlinked with the inductor pole coils 27 to generate a larger capacity of induced currents.

When magnetic resistance of the inductor pole coils 27 with the surroundings is small, for example, heavy magnetic fluxes flow into the rotor teeth 22 to lower the salient pole ratio and hence to reduce the reluctance torque conspicuously. In addition, when the heavy magnetic fluxes flow into the rotor teeth 22, torque may act in a negative (reverse rotation) direction or magnetic interference may occur to cause reduction in the torque, depending on the relative positional relation between the stator 11 and the rotor 21.

Therefore, the inductor pole coils 27 are placed between the rotor teeth 22 and inside the slots 23 which are made magnetically independent by a gap or a non-magnetic substance such as aluminum or resin, in order to avoid disadvantages caused by magnetic connection between the inductor pole coils 27 and the rotor teeth 22.

Figure 12:
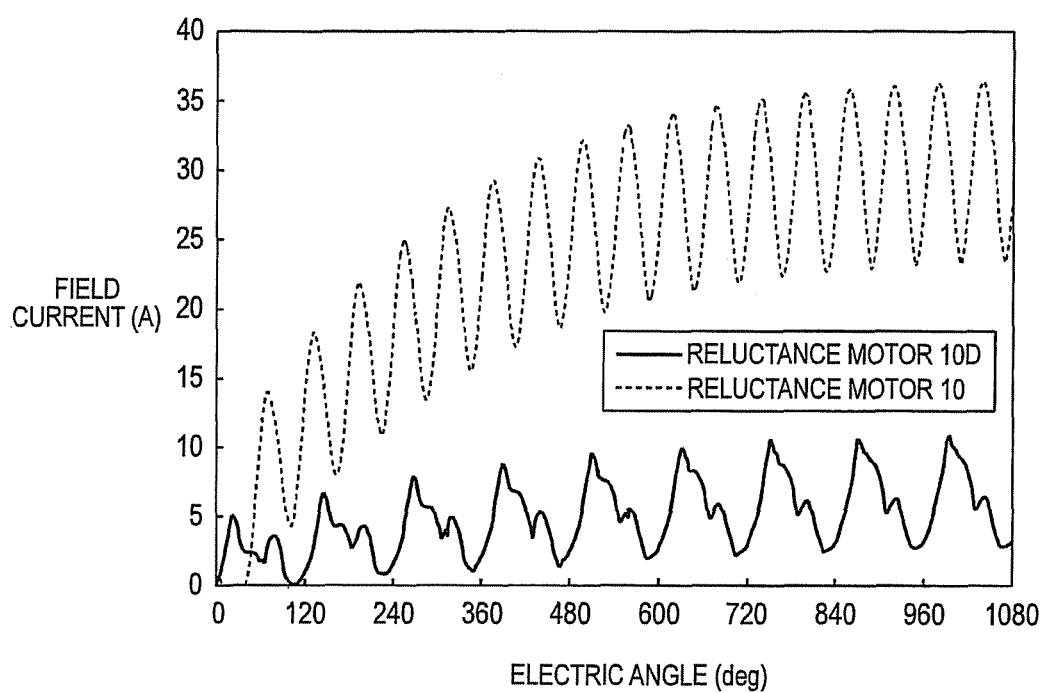
FIG. 12 is a graph showing the waveform of an induced current generated in each inductor pole coil in the reluctance motor according to the embodiment shown in FIG. 1 and the waveform of an induced current generated in the reluctance motor having the unimproved prototype structure shown in FIG. 3.
Figure 13:
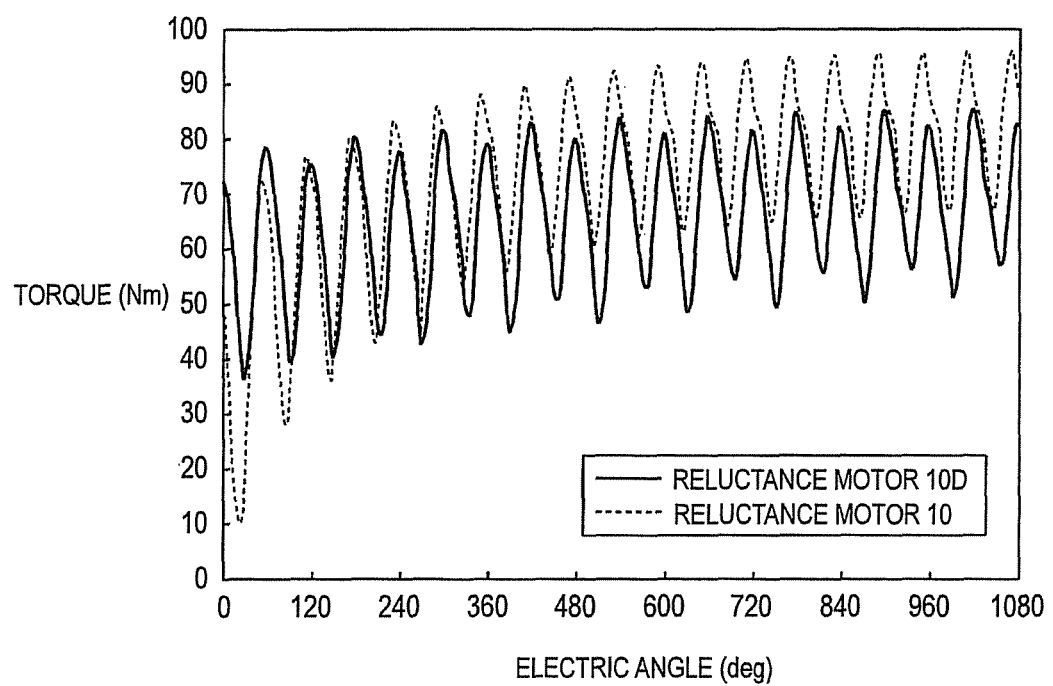
FIG. 13 is a graph showing torque obtained using an induced current of the reluctance motor according to the embodiment shown in FIG. 1 and torque obtained using an induced current of the reluctance motor having the unimproved prototype structure shown in FIG. 3.

From this fact, it is understood that the reluctance motor 10 can generate induced currents and collect loss energy in the inductor pole coils 27 more efficiently than the reluctance motor 10D, as shown in FIG. 12. It is understood that due to the induced currents the reluctance motor 10 is more improved in torque characteristic than the reluctance motor 10D, as shown in FIG. 13. According to the torque characteristic shown in FIG. 13, the reluctance motor 10 can be improved to be about 19.5% higher in steady torque than the reluctance motor 10D while the torque ripple in the reluctance motor 10 can be more reduced than that in the reluctance motor 10D.

In addition, when, for example, the reluctance motor 10 and the reluctance motor 10B are driven with the same stator structure under the same drive conditions (rotational speed, current value and current phase angle), the reluctance motor 10 can be improved to be about 57.5% higher in steady torque than the reluctance motor 10B while the torque ripple in the reluctance motor 10 can be reduced to be about 49.8% lower than that in the reluctance motor 10B. As a result, in the reluctance motor 10, the magnetic vibration of the stator caused by the torque ripple (for example, a vibration mode shown in FIG. 14) can be also reduced so that the electromagnetic vibration and the electromagnetic noise in the motor can be also reduced.

The reluctance motor 10 is manufactured to have a structure in which the ratio of the number P of salient poles (rotor teeth 22) on the rotor 21 side to the number S of slots 13 on the stator 11 side corresponds to 2:3 as a structure mainly using 3f-order spatial harmonic magnetic fluxes (f=1, 2, 3 . . . ). For example, the third spatial harmonic magnetic fluxes are pulsated in a shorter cycle because the frequency of the third spatial harmonic magnetic fluxes is higher than the fundamental frequency inputted to the drive coils 14. Therefore, the magnetic fluxes interlinked with the inductor pole coils 27 between the rotor teeth 22 change in strength so that the rotor 21 can generate induced currents efficiently. Thus, the rotor 21 can rotate due to the loss energy collected efficiently from the spatial harmonic components superimposed on the magnetic flux of the fundamental frequency efficiently.

The reason why P/S=2/3 is used as the ratio of the number P of salient poles of the rotor teeth to the number S of stator slots in the reluctance motor 10 as to the structure for determining the quality of relative magnetic action between the rotor 21 side and the stator 11 side is because electromagnetic vibration can be reduced and rotation with small electromagnetic noise can be achieved.

In detail, according to magnetic field analysis applied to the magnetic flux density distribution in the same manner as above, the magnetic flux density distribution is also dispersed circumferentially within a mechanical angle of 360° in accordance with the ratio of the number P of salient poles of the rotor teeth to the number S of stator slots. Therefore, uneven distribution is also recognized in the distribution of electromagnetic force acting on the stator 11.

Figure 14:
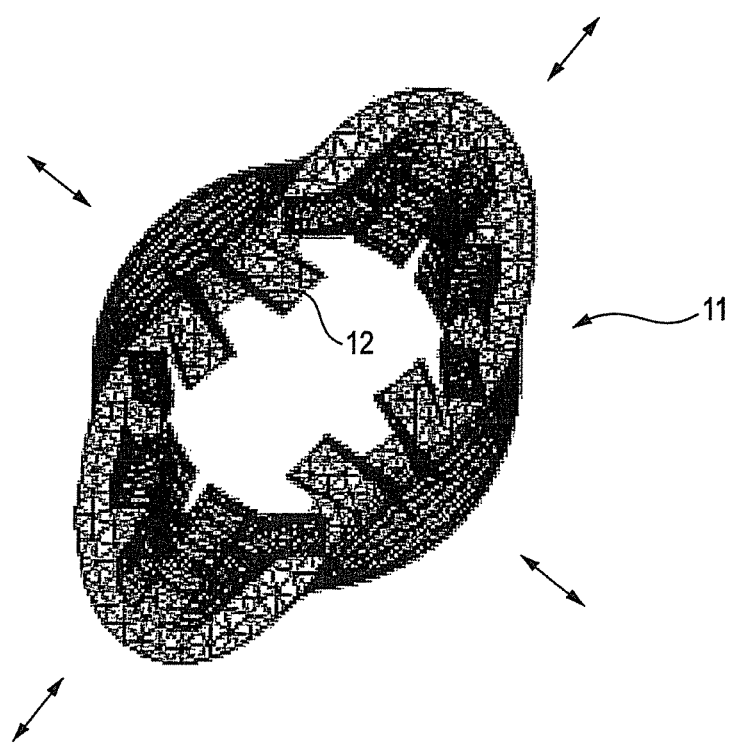
FIG. 14 is a deformed plan view showing an example of electromagnetic vibration generated due to the ratio between the number of stator-side slots and the number of rotor-side salient poles, which vibration is observed from the axis.

Therefore, for example, in the case of an 8P9S structure having a combination of eight salient poles of rotor teeth and nine stator slots, an uneven magnetic flux density distribution which is circumferentially uneven within the mechanical angle of 360° may be formed so that unevenness can occur also in the distribution of electromagnetic force acting on the stator 11 and large electromagnetic vibration can occur. In addition, in the case of a 14P12S structure, high and low regions in a relationship of rotational symmetry with each other are formed in the magnetic flux density distribution. As shown in FIG. 14, large electromagnetic vibration may occur in a vibration mode of k=0 in which radial contraction and expansion without rotation in the vibrating direction are repeated in the reluctance motor, which may be thus deformed into an elliptical shape. When the electromagnetic vibration occurs in this manner, large electromagnetic noise may occur as a result.

Figure 15:
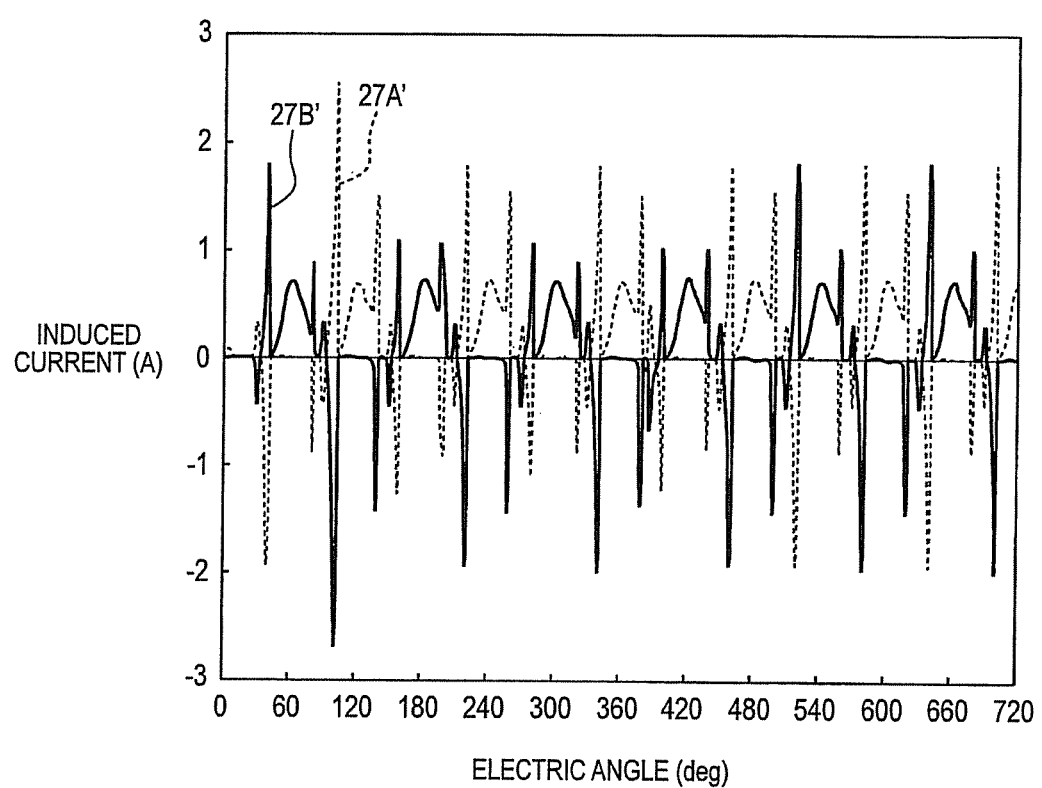
FIG. 15 is a graph showing the quality of the induced currents generated due to the ratio between the number of stator-side slots and the number of rotor-side salient poles.

Further, in the case of a 16P18S structure, some regions where the magnetic fluxes cannot be interlinked may be formed circumferentially within the mechanical angle of 360°, resulting in decrease in the collected energy amount. In addition, in the case of the 16P18S structure, the combined waveform of the induced currents generated in the inductor pole coils, which waveform corresponds to FIG. 7, also has a waveform where noise appears as if it were on each inductor pole coil 27A', 27B', as shown in FIG. 15. Thus, the rotor 21 cannot be rotated stably.

On the other hand, in the reluctance motor 10, an 8P12S (P/S=2/3) structure having a combination of eight salient poles of rotor teeth and twelve stator slots is used. Thus, the magnetic fluxes can be interlinked in an even density distribution all over the circumference within the mechanical angle of 360° so that the rotor 21 can be rotated with high quality inside the stator 11.

Thus, in the reluctance motor 10, the spatial harmonic magnetic fluxes are not lost but can be used for rotation operation. In addition, the loss energy can be collected efficiently so that electromagnetic vibration can be reduced on a large scale and the reluctance motor 10 can be rotated very quietly.

Figure 16:
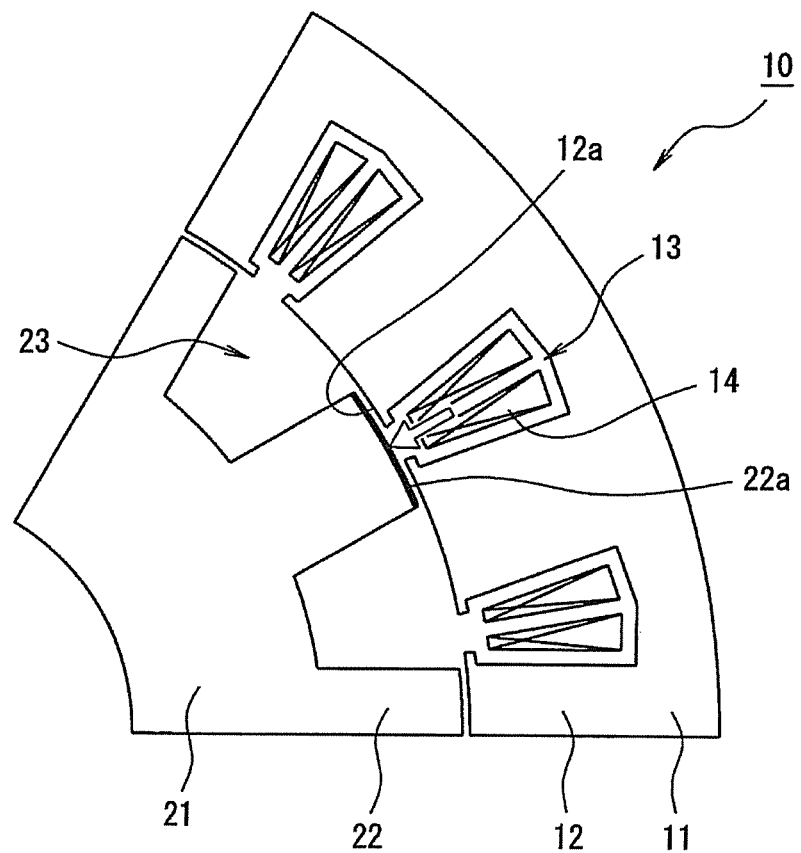
FIG. 16 is a conceptual model diagram in which correspondence between the number of stator-side slots and the number of rotor-side salient poles is depicted in the partial enlarged radially sectional view of the reluctance motor according to the embodiment.
Figure 17:
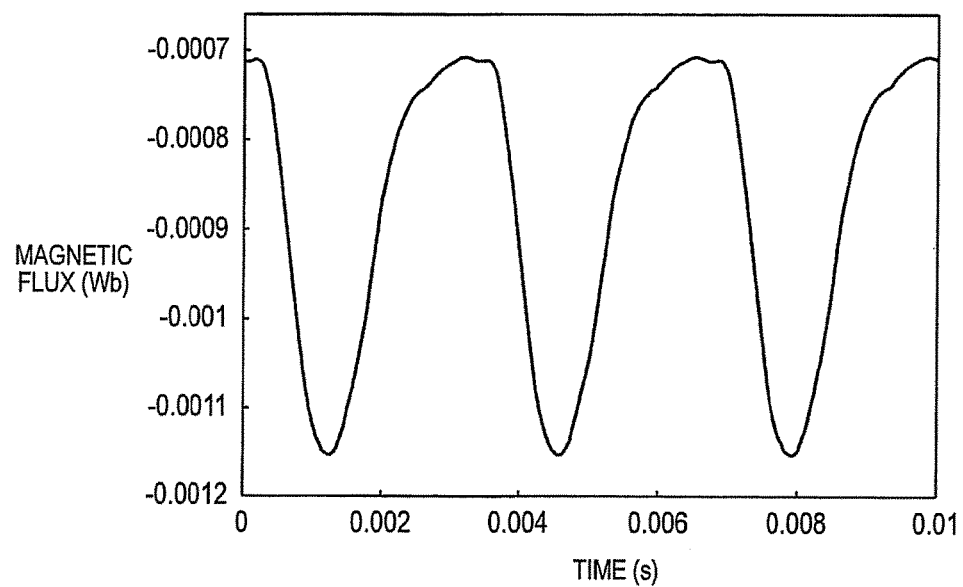
FIG. 17 is a graph showing the waveform of a spatial harmonic component superimposed on the magnetic flux from the stator side interlinked with the rotor side in the reluctance motor according to the embodiment.
Figure 18:
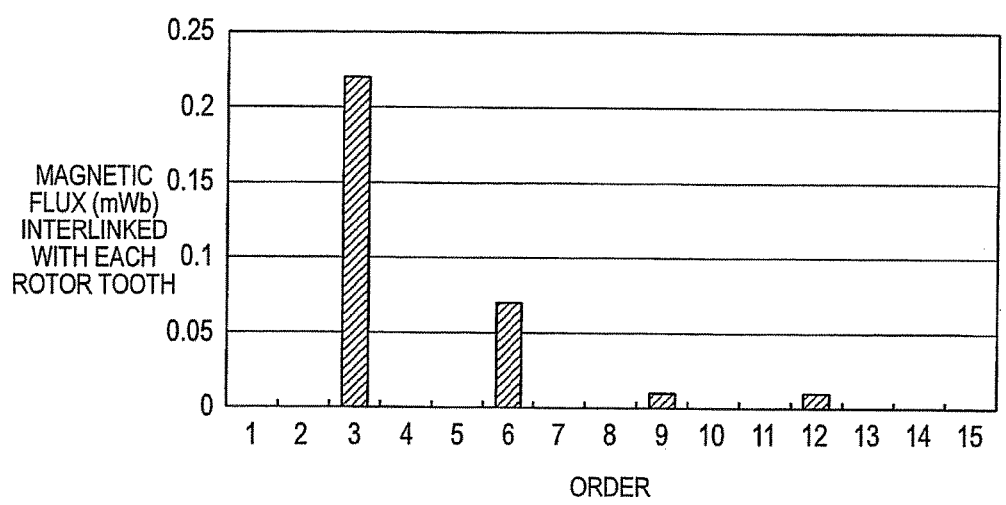
FIG. 18 is a graph showing the strength of interlinkage magnetic flux in accordance with each 3f-order spatial harmonic magnetic flux as a result of Fourier series expansion of the waveform of the magnetic flux shown in FIG. 17.

Incidentally, as shown in FIG. 16, magnetic flux having a waveform shown in FIG. 17 is interlinked with each rotor tooth 22 in the reluctance motor 10 having the P/S=2/3 structure. When this magnetic flux waveform is subjected to Fourier series expansion, the magnitude of a third-order component is the largest in the 3f-order spatial harmonic magnetic flux as shown in FIG. 18. Accordingly, it is understood that the third-order component is optimal for generating an induced current in each inductor pole coil 27. Incidentally, illustration of the coils 27 and 28 are not shown in FIG. 16, in accordance with FIGS. 19 to 21 which will be described later.

Figure 19:
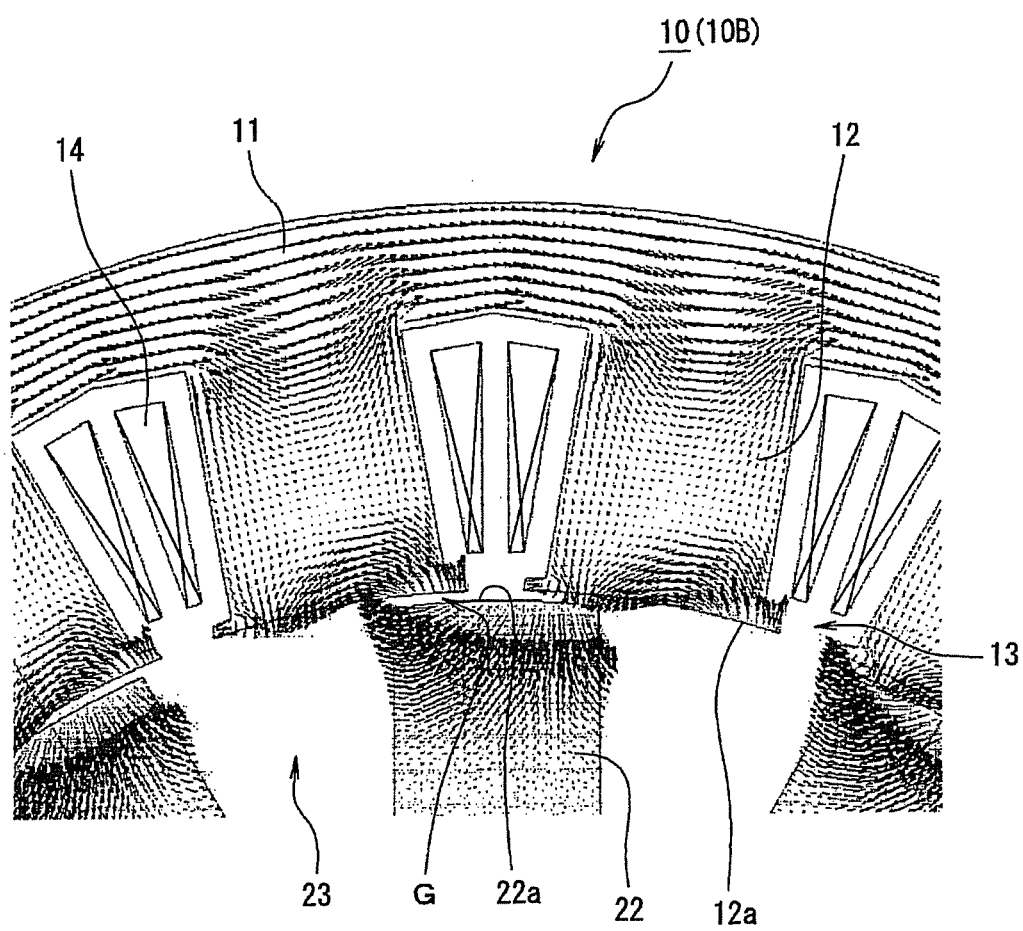
FIG. 19 is a conceptual diagram in which the magnetic flux density distribution of third spatial harmonic magnetic flux whose interlinkage magnetic flux strength is shown in FIG. 18 is indicated in vector representation.
Figure 20:
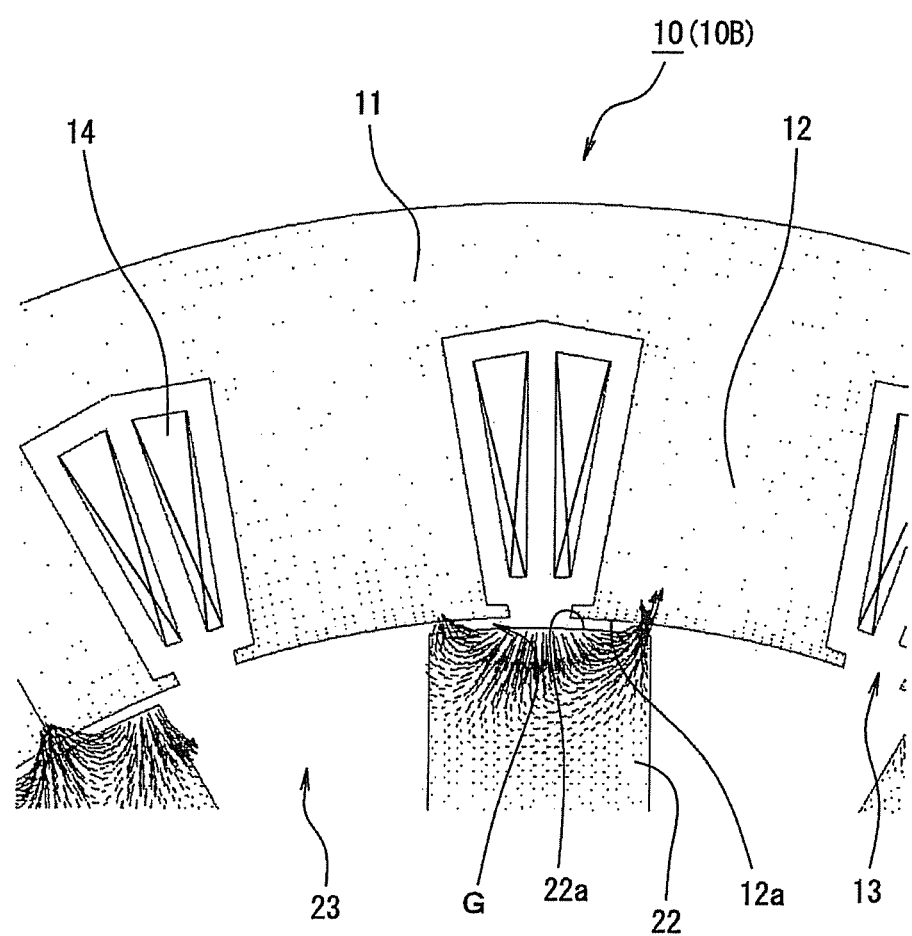
FIG. 20 is a conceptual diagram in which the magnetic flux density distribution of sixth spatial harmonic magnetic flux whose interlinkage magnetic flux strength is shown in FIG. 18 is indicated in vector representation.
Figure 21:
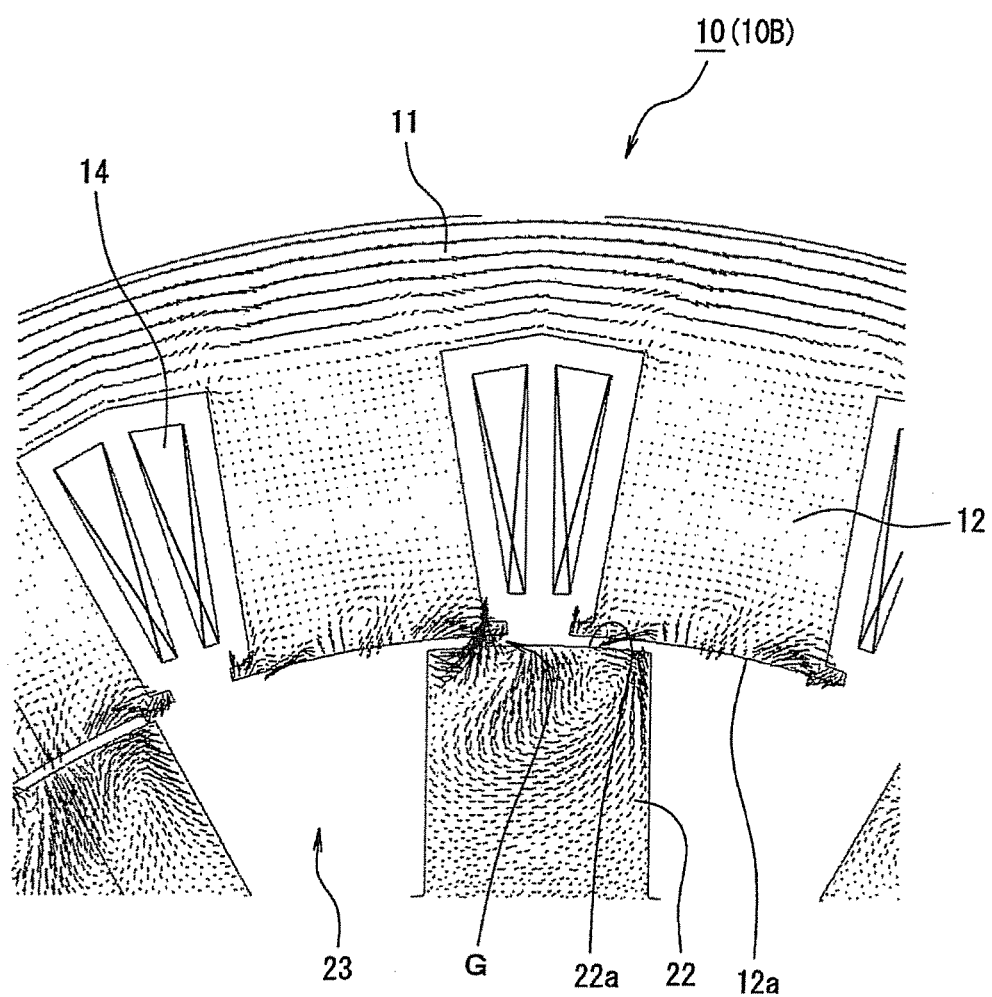
FIG. 21 is a conceptual diagram in which the magnetic flux density distribution of ninth spatial harmonic magnetic flux whose interlinkage magnetic flux strength is shown in FIG. 18 is indicated in vector representation.

When the magnetic flux density distribution of the 3f-order spatial harmonic magnetic fluxes is displayed in vector representation, it is understood that the third spatial harmonic magnetic fluxes shown in FIG. 19 can be interlinked in a high density which is at least several times as high as that of the sixth spatial harmonic magnetic fluxes shown in FIG. 20 or that of the ninth spatial harmonic magnetic fluxes shown in FIG. 21.

From this result, the structure of P/S=2/3 is used in the reluctance motor 10. The spatial harmonic magnetic flux distributions shown in FIGS. 19 to 21 are created as vector diagrams in the structure of the reluctance motor 10B which is the base of the reluctance motor 10, for the sake of comparison.

Thus, in the reluctance motor 10, electric power is not supplied to any other than the drive coils 14 of the stator 11, but induced currents can be generated efficiently in the inductor pole coils 27 placed on the rotor 21 side and supplied as field currents to the electromagnet coils 28, which can serve as self-excitation electromagnets. Thus, the reluctance motor 10 gains auxiliary rotating force for assisting the primary rotating force generated by the electric power supplied to the drive coils 14 so that the reluctance motor 10 can be rotated with high efficiency.

Figure 22:
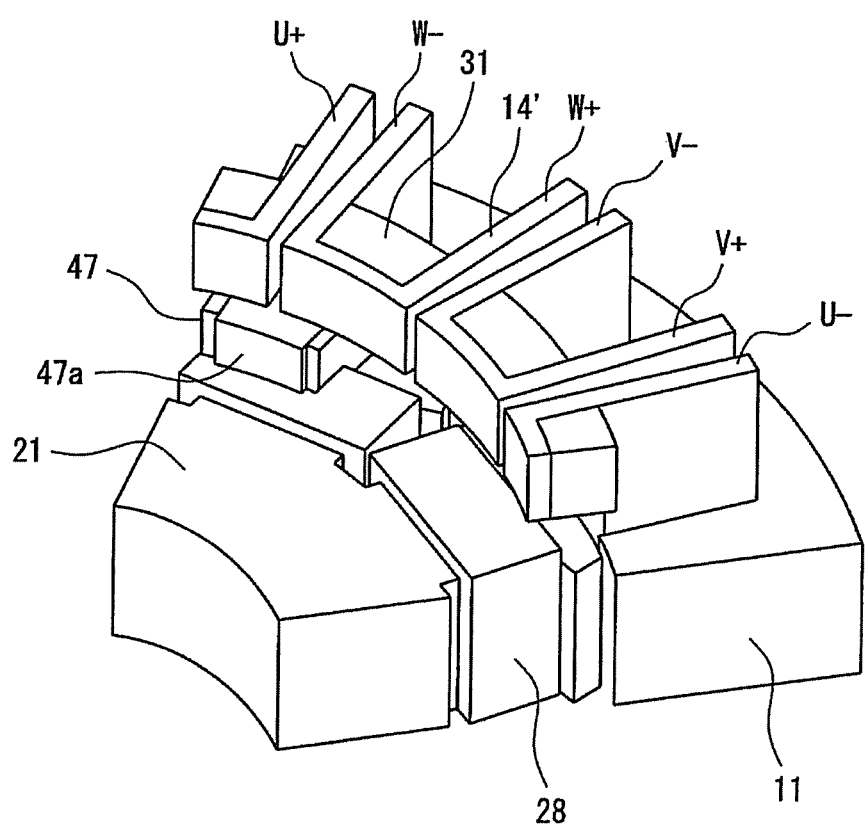
FIG. 22 is a perspective view in which a reluctance motor according to another mode of the embodiment has been partially cut away.
Figure 23:
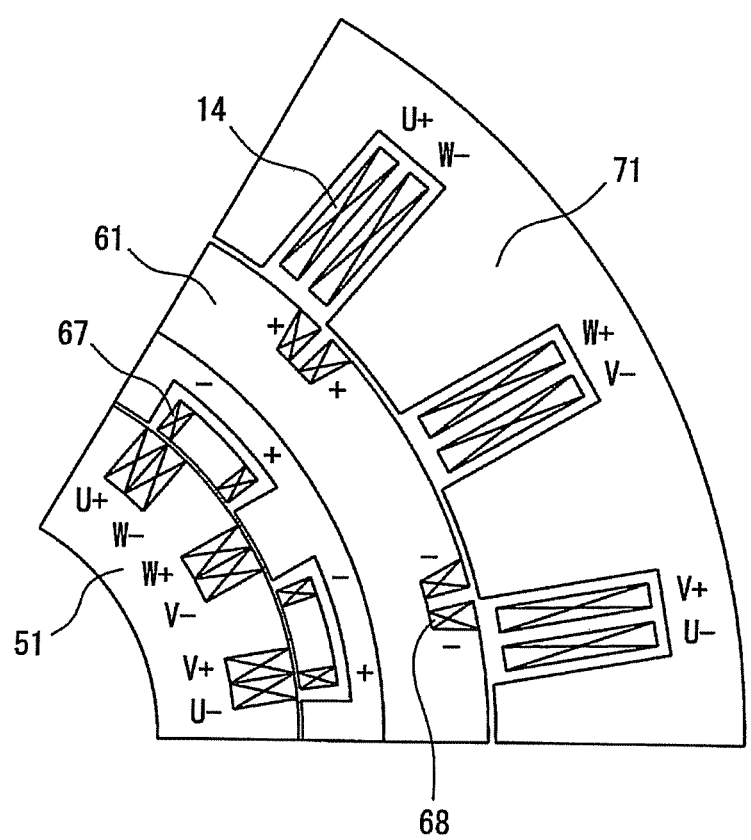
FIG. 23 is a partially enlarged radially sectional view in which a schematic configuration of a reluctance motor according to another mode of the embodiment than that of FIG. 22 is shown in the same manner as in FIG. 1.

As another mode of the embodiment than the radial gap structure as in the reluctance motor 10, the reluctance motor 10 may be manufactured to have an axial gap structure. In this case, for example, the reluctance motor 10 may be manufactured to have a multigap type structure shown in FIG. 22. In the multigap type structure, axial stators 31 opposed to an axial end surface side of a rotor 21 are formed on the side of a stator 11 and extended drive coils 14' are wound on the axial stators 31. In addition, a structure in which inductor pole coils 47 opposed to the axial stators 31 on their axial end surface side are wound on core materials 47a is added on the rotor 21 side.

When the reluctance motor is manufactured to have a flat large-diameter motor structure, a double gap type motor structure in which a rotor is received rotatably between an inner stator and an outer stator may be used. In the double gap type motor structure, inductor pole coils 67 are placed on the inner circumferential surface side of a rotor 61 opposed to an inner stator 51 to collect loss energy and electromagnet coils 68 are placed on the outer circumferential surface side of the rotor 61 opposed to an outer stator 71 to generate torque using the collected induced currents as field currents.

In motors having a radial gap structure like the reluctance motor 10, the stator 11 and the rotor 21 are often manufactured to have a laminate structure of electromagnetic steel sheets. However, the invention is not limited thereto. For example, a so-called SMC core may be used. The SMC core is a dust core in which soft magnet composites formed out of magnetic particles such as iron powder subjected to surface treatment of insulation coating are further subjected to iron powder compression molding and thermal treatment. This SMC core is preferable for the axial gap structure because it can be molded easily.

Further, the reluctance motor 10 is not limited for on-vehicle use. The reluctance motor 10 may be used preferably, for example, as a drive source of a wind power generator, a machine tool, etc.

The scope of the invention is not limited to the illustrative embodiment shown in the drawings and description but may include all embodiments which can bring equivalent effects to any motor at which the invention is aimed. Further, the scope of the invention is not limited to combination of characteristics of the invention described in Claims but may be described in accordance with any desired combination of specific characteristics selected from all the disclosed characteristics.

What is claimed is:

1. A reluctance motor comprising: a stator provided with drive coils to which multiphase drive currents are inputted; and a rotor provided with a plurality of salient poles which receive primary rotating force when magnetic fluxes generated in the drive coils are interlinked with the rotor, wherein:
   the rotor comprises:
      inductor pole coils which are placed on magnetic paths on which spatial harmonic components superimposed on the magnetic fluxes generated in the drive coils are interlinked with the rotor side so that induced currents can be generated in the inductor pole coils due to the spatial harmonic components of the magnetic fluxes;
      rectifier elements which rectify the induced currents generated in the inductor pole coils; and
      electromagnet coils to which the induced currents rectified by the rectifier elements are conducted as field currents so that the electromagnet coils can be self-excited to thereby generate electromagnetic force as auxiliary rotating force for assisting the primary rotating force, and
      core materials made of a magnetic substance are placed between adjacent ones of the salient poles of the rotor,
      the electromagnet coils are concentratedly wound only on the salient poles, and
      the inductor pole coils are concentratedly wound only on the core material, wherein the core material is provided on the salient poles via a non-magnetic substance.

2. The reluctance motor according to claim 1, wherein a ratio of a number P of the salient poles of the rotor to a number S of slots in which the drive coils of the stator are placed is set in $P/S=2/3$.

* * * * *